United States Patent Office 3,850,956
Patented Nov. 26, 1974

3,850,956
FUSED IMIDAZOLIDINE DERIVATIVES
Willem Jacob van der Burg, Heesch, Netherlands, assignor to Akzona Incorporated, Asheville, N.C.
No Drawing. Filed Sept. 22, 1972, Ser. No. 291,188
Claims priority, application Netherlands, Oct. 5, 1971, 7113679
Int. Cl. C07d 57/02, 57/04
U.S. Cl. 260—309.7                                2 Claims

ABSTRACT OF THE DISCLOSURE

The invention relates to compounds with the formula:

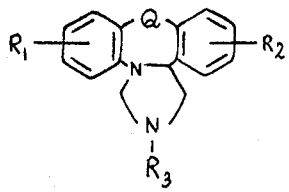

in which

Q represents a single bond, a —CH=CH— moiety, a —CH$_2$—CH$_2$— moiety, or a —CHR— moiety, in which R is hydrogen or an alkyl group with 1-6 carbon atoms, R$_1$ and R$_2$ represent hydrogen, halogen, hydroxy, an alkyl or alkoxy group with 1-6 carbon atoms, a trifluoromethyl group or an acyloxy group with 1-8 carbon atoms, and R$_3$ represents hydrogen, an alkyl group (1-6 C), an aryl group or an aralkyl group (7-9 C), as well as acid addition salts, quaternary ammonium compounds and nitrogen oxides thereof.

These compounds exert antiserotonine, antihistamine, CNS and anti-ulcer activity.

---

The present invention relates to novel biologically active imidazolidine derivatives. More particularly it relates to tetrahydro-dibenzo-imidazo-phenanthridines, -azepines and -azocines.

From the British Pat. 1,173,783 compounds are known differing from the compounds according to the present invention in that they possess a piperazine instead of an imidazolidine ring.

These known piperazine derivatives possess antihistaminic and antiserotonic activity.

Surprisingly it has now been found that the present imidazolidine derivatives of the general formula:

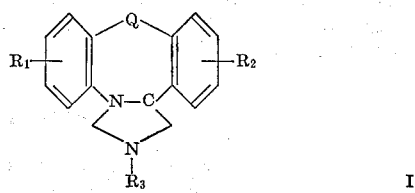

R$_1$ and R$_2$=hydrogen, hydroxy, halogen, alkyl or alkoxy with 1-6 carbon atoms, acyloxy with 1-8 carbon atoms, or a trifluoromethyl group,
R$_3$=hydrogen, an alkyl group with 1-6 carbon atoms, an aryl group or an aralkyl group with 7-9 carbon atoms, and
Q=a single bond, a —CH$_2$—CH$_2$— group, a
—CH=CH—
group, or a

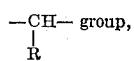

in which R represents hydrogen or an alkyl group with 1-6 carbon atoms, as well as pharmaceutically acceptable acid addition salts, pharmaceutically acceptable quaternary ammonium compounds and nitrogen (N$^2$)-oxides thereof, possess a much stronger activity than the said known piperazine derivatives. Moreover the toxicity of the present compounds is very small.

The compounds according to the invention can be prepared by any method commonly used for this type of compounds. They are, however, prepared most conveniently starting from a substance with the general formula:

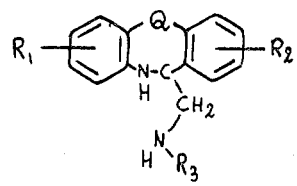

or an acid addition salt thereof, in which Q, R$_1$, R$_2$ and R$_3$ have the meanings indicated previously.

The starting substance II is ringclosed by means of a condensation-reaction with a reagent of the general formula:

III

Y represents hydrogen (H$_2$), oxygen or sulphur, and Z$_1$ and Z$_2$ are reactive and/or easily removable groups in such a condensation reaction (leaving groups). Z$_1$ and Z$_2$ may be equal or different groups.

If Y represents hydrogen, Z$_1$ and Z$_2$ stand preferably for halogen or hydroxy groups. Reagents belonging to this class of substances are for example: methylenechloride, methylene bromide and methylene diol (=aqueous solution of formaldehyde).

If Y represents oxygen or sulphur the most suitable moieties for Z$_1$ and Z$_2$ are halogen, the group —NR$_4$R$_5$, in which R$_4$ and R$_5$ may be hydrogen, a hydrocarbon radical, an acyl group or together a heterocyclic ring system, further the group OR$_6$ or SR$_6$, in which R$_6$ represents hydrogen, a hydrocarbon radical, a sulfonyl radical, a carbonyl radical, a substituted aryl radical, etc. Suitable reagents belonging to this class of substances are, for example, phosgene, thiophosgene, haloformic esters, such as ethylchloroformate, carbonic-acid esters such as diethylcarbonate, urea-derivatives, such as urea, thiourea or N,N'-carbonyl-di-imidazole etc.

Preferably methylene-halide or formaldehyde are used as a reagent in the present condensation reaction because they yield the desired final product according to the invention direct.

If reagents, in which Y represents oxygen or sulphur, are used, the resulting compound must be reduced additionally to obtain the desired final product. For such a reduction any suitable reducing agent can be used, for example metal hydrides such as sodium hydride, lithium aluminium hydride or diborane. Said reduction can also be performed catalytically by hydrogenation in the presence of a metal or a metal compound.

If Z$_1$ and/or Z$_2$ represent halogen an agent capable of binding the hydrohalide released in the condensation reaction, such as pyridine, triethyl amine, etc., is usually added to the reaction mixture.

The starting substances of general formula II are known from for example the British patent specification 1,173,-783 mentioned before. These starting diamines are depicted by formula III in the drawings of said British patent and their use is described in the specification thereof at page 2, lines 34–42, disclosing the preparation of piperazine compounds therefrom. The British patent in sheet 1 of the drawings discloses the formula of intermediate III to be:

III
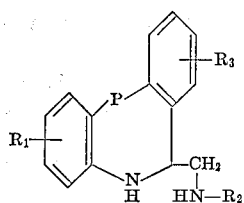

in which $R_1$ and $R_3$ each represent hydrogen, halogen, hydroxy, lower acyloxy, lower alkyl, lower alkoxy or trifluoromethyl; $R_2$ represents hydrogen or lower alkyl; and P represents a single bond, or a methylene, ethylene or

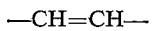

group. The preparation of specific examples of a diamine of formula III is given in Examples V and VI of said British patent. Example V, paragraphs (a)–(e) describe the conversion of benzylaniline by reaction with chloracetyl chloride to form N-chloroacetyl-2-benzylaniline, which is then treated with phosphorus oxychloride and polyphosphoric acid to convert it to 6-chloromethyl-morphanthridine, which is treated with methylamine to transform it into 6-methylaminomethyl-morphanthridine, which is reacted with lithium aluminum hydride to form 5,6-dihydro - 6 - methylamino-methyl-morphanthridine, a product of formula III in which P is a direct bond, $R_1$ and $R_3$ are hydrogen, and $R_2$ is methyl. Example VI, paragraphs (a)–(e) describe the conversion of 5H-dibenzo [a,d]-cycloheptenone-5-oxime by reaction with thionyl chloride, to 6-chloro-dibenzo(b,f)-azocine, which is then treated with sodium cyanide in dimethylformamide solution to yield 6-cyano-dibenzo-(b,f)-azocine; the latter is reacted with lithium aluminum hydride in tetrahydrofuran to form 6-aminomethyl-5,6-dihydrobenzo-(b,f)-azocine, which is reacted with methyl formate to form 6-formyl-aminomethyl-5,6-dihydro-dibenzo-(b,f)-azocine, which is then reacted with lithium aluminum hydride to yield 6-methylaminomethyl-5,6-dihydro-dibenzo-(b,f)-azocine, a compound of formula III in which P is —CH=CH—, $R_1$ and $R_3$ are hydrogen, and $R_2$ is methyl.

The condensation reaction can be performed in any suitable solvent. Where methylene halide is used as the reagent (III) special preference is given to an aprotic polar solvent such as dimethyl-sulphoxide, sulfolane or acetonitril. It is also possible, however, to perform the condensation exclusively in the reagent, for example methylene-chloride or aqueous formaldehyde solution, so in the absence of a solvent. In certain cases, e.g. where urea is used as the reagent, the condensation can be carried out in a melt.

The acid addition salts of the compounds according to the invention are prepared in the conventional manner by reacting the free base with a pharmaceutically acceptable acid such as, for example, hydrochloric acid, hydrobromic acid or hydroiodic acid, phosphoric acid, acetic acid, propionic acid, glycollic acid, maleic acid, malonic acid, succinic acid, tartaric acid, citric acid, ascorbic acid, salicylic acid or benzoic acid.

The pharmaceutically acceptable quaternary ammonium compounds are obtained by reacting the compounds of the general formula I, for example, with a lower alkyl (1–4 C)-halide, preferably methyliodide.

The $N^2$-nitrogen oxides of the compounds according to the invention are prepared by oxidation of the compounds I with for example $H_2O_2$ or a per acid, such as perchloric acid.

From the above general formula I it appears that the compounds according to the invention possess a chiral carbon atom. Consequently optical antipodes are possible, which also form part of this invention. Said optical antipodes can be isolated from the racemic mixture according to formula I. It is also possible to resolve the starting product II and to perform the condensation reaction after that, or to resolve an intermediate product in the synthesis of the compounds I.

The compounds according to the invention obtained after the condensation reaction can obviously be converted into other compounds according to the invention.

Thus a substituent at one or both phenyl nuclei (of formula I) can be converted in a conventional manner into another substituent, for example, a hydroxy group into an alkoxy group, hydroxy into halogen, hydroxy into acyloxy, etc.

The substituent ($R_3$) at the $N^2$-nitrogen atom can be obtained by alkylating or aralkylating the unsubstituted nitrogen atom ($R_3$=H) or by acylating the unsubstituted nitrogen atom followed by a reduction of the carbonyl moiety of a compound thus obtained.

It is also quite obvious and well-known in the art to convert the alkyl- or aralkyl substituted $N^2$-nitrogen atom (of formula I) into the unsubstituted nitrogen atom, for example by heating with chloroformic acid ester, followed by hydrolysis of the compound thus obtained.

Besides the antiserotonic and antihistaminic activities already mentioned before, the compounds according to the invention also have a CNS activity, especially sedative properties, and an anti-ulcer activity. They can be administered both orally and parenterally, preferably in a daily dosage of from 0.01 to 1 mg. per kg. body weight. Mixed with suitable auxiliaries the compounds can be compressed into solid dosage units such as pills, tablets and coated tablets. They can also be processed into capsules mixed with auxiliaries, if desired. By means of liquids the compounds can be applied as an injection preparation in the form of solutions, emulsions or suspensions.

Compounds, which are preferably administered, are:

2,6-dimethyl-2,3,9,13b-tetrahydro-1H-dibenzo[c,f]-imidazo [3,4-a]-azepine, rac. 2(N)-methyl-2,3,9,13b-tetrahydro-1H-dibenzo[c,f]-imidazo [3,4-a]-azepine, (—)-2(N)-methyl-2,3,9,13b-tetrahydro-1H-dibenzo[c,f]-imidazo [3,4-a]-azepine, 2(N)-methyl-1,2,3,9,10,14b-hexahydro-dibenzo[c,g]-imidazo [3,4-a]-azocine.

More generally the compounds of the general formula I, in which Q represents a

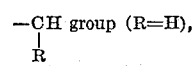

are preferred over the other compounds of formula I.

The following examples serve to illustrate the preparation of the compounds according to the invention.

In the examples the following nomenclature and numbering has been used:

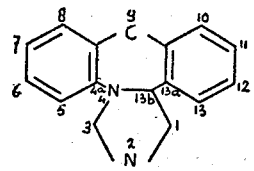

2,3,9,13b-tetrahydro-1H-dibenzo[c,f]-imidazo[3,4-a]azepine, or 1,2,3,13b-tetrahydro-imidazo[3,4-a]-morphanthridine

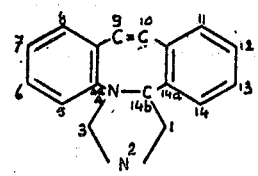

1,2,3,14b-tetrahydro-dibenzo[c,g]-imidazo[3,4-a]-azocine

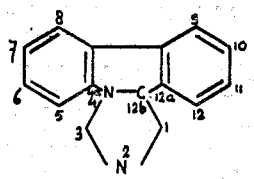

1,2,3,12b-tetrahydro-imidazo[3,4-a]-phenanthridine

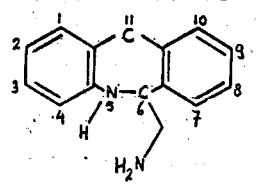

6-aminomethyl-5,6-dihydro-11H-dibenzo[b,e]-azepine, or 6-aminomethyl-5,6-dihydro-morphanthridine

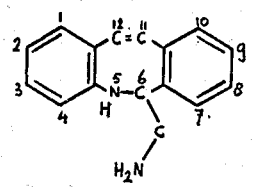

6-aminomethyl-5,6-dihydro-dibenzo[b,f]-azocine

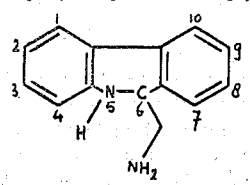

6-aminomethyl-5,6-dihydro-phenanthridine

EXAMPLE I

Preparation 2,6-dimethyl-2,3,9,13b-tetrahydro-1H-dibenzo[c,f]-imidazo [3,4-a]-azepine (a) 2.5 gm. of 3-methyl - 6 - methylaminomethyl-5,6-dihydro-morphanthridine are dissolved in a mixture of 12.5 ml. of dichloromethane, 12.5 ml. of dimethyl-sulphoxide and 5 ml. of triethyl amine. The reaction mixture is refluxed for 5 hours. The excess of methylene chloride and triethyl amine is distilled off in vacuo. The remaining dimethylsulphoxide solution of the final product is diluted with a fivefold quantity of water, then the final product crystallises out. The dilute solution is left to stand for 30 minutes after which the crystals are sucked off and recrystallised from 96% ethanol. Melting point 105–107° C.

(b) In the same manner as the 2,6-dimethyl compound are prepared:

the 2-methyl-12-trifluoromethyl compound,
the 2-methyl-7-chloro compound (F 120–123° C.),
the 2,12-dimethyl compound (F 119–121° C.),
the 2,7-dimethyl compound (F 94–96° C.) and
the 2-methyl-10-methoxy compound (F 110–113° C.).

EXAMPLE II

Preparation 2,6-dimethyl-2,3,9,13b-tetrahydro-1H-dibenzo[c,f]-imidazo [3,4-a]-azepine (a) Two grams of 3-methyl - 6 - methylaminomethyl-5,6-dihydro-morphanthridine are added to a mixture of 30 ml. of ethanol and 10 ml. of a 40% solution of formaldehyde in water. The mixture is refluxed for 3 hours, after which it is evaporated in vacuo to a volume of about 20 ml. Then 20–40 ml. of water are added. The mixture is left to stand for some time, after which the precipitate formed is filtered off, dried and finally recrystallised from ethanol. Melting point 105–106° C.

(b) 500 mg. of the product obtained under IIa (m.p. 105–106° C.) are boiled for 5 minutes in 10 ml. of ether and 2 ml. of methyliodide. The mixture is cooled down, after which the resulting precipitate is filtered off and recrystallised from alcohol. Melting point of the iodomethylate obtained: 239–241° C.

EXAMPLE III

Preparation 2,9-dimethyl-2,3,9,13b-tetrahydro-1H-dibenzo[c,f]-imidazo [3,4-a]-azepine 0.5 gm. of 11-methyl - 6 - methylaminomethyl-5,6-dihydro-morphanthridine is added to a mixture of 2.5 ml. of methylene chloride, 2.5 ml. of dimethyl-sulphoxide and 1 ml. of triethyl amine.

The mixture is refluxed for 5 hours, after which the excess of methylenechloride and triethylamine is distilled off.

To the residue water is added, after which the mixture is extracted with ether. After evaporation the above substance is obtained, which has a melting point of 137–139° C. (after recrystallisation from ethanol). The product obtained (0.3 gm. thereof) is stirred into a mixture of 10 ml. of glacial acetic acid and 2 ml. of 30% $H_2O_2$. After dilution with water, neutralisation with NaOH, extraction with ether and evaporation the corresponding nitrogen-oxide is obtained.

EXAMPLE IV

Preparation 2-methyl-1,2,3,14b-tetrahydro-dibenzo-[c,g]-imidazo[3,4-a]-azocine 530 mg. of 6-methylaminomethyl-5,6-dihydro-dibenzo-[b,f]-azocine are added to a mixture of 8.5 ml. of methylenechloride, 8 ml. of dimethylsulphoxide and 3.5 ml. of triethylamine. The mixture is refluxed for 5 hours, after which the excess of methylenechloride and triethylamine is distilled off.

To the residue water is added and the mixture extracted with diethylether. Chromatographic purification with a solvent mixture (methanol and acetone—9:1) yields the above substance. Melting point 99–102° C. $R_f$ in methanol:acetone (9:1)=0.75 on $SiO_2$.

EXAMPLE V

Resolution of 6-methylaminomethyl-5,6-dihydro-morphanthridine

Fifty grams of racemic 6-methylaminomethyl-5,6-dihydro-morphanthridine are dissolved in 1 ltr. of ethanol, after which 75 gm. of dibenzoyl (—) tartaric acid, dissolved in 1 ltr. of ethanol, are added. Immediately a precipitate forms. The mixture is left to stand for 48 hours, after which the precipitate formed is filtered off and washed with alcohol and ether. Melting point of the salt 176–178° C. Then the precipitate is added to a mixture of ammonia and benzene (1:1) and shaken for some time. The benzene layer is separated and washed with water finally. The benzene is evaporated and the residue recrystallised from hexane to which some ethanol has been added. Melting point 117–118° C.; $[\alpha_D]^{25}=+166°$.

In the same manner the (—) enantiomer is obtained by using dibenzoyl-(+)-tartaric acid. Melting point 116–118° C. and $[\alpha_D]^{25}=-165°$.

EXAMPLE VI

Preparation racemic 2 - methyl-2,3,9,13b-tetrahydro-1H-dibenzo[c,f]-imidazo[3,4-a]-azepine and the (+) and (—) isomer A. Racemic mixture: Two grams of 6-methylaminomethyl-5,6-dihydro-morphanthridine are dissolved in 10 ml. of methylenechloride, after which 10 ml. of dimethylsulphoxide and 4 ml. of triethylamine are added. The mixture is refluxed for 5 hours, after which the excess of methylenechloride and triethylamine is evaporated. Then 10 ml. of water are added to the residual solution. The crystals formed are recrystallised from ethanol. Melting point of the racemic substance: 133–135° C. The iodomethylate of this substance is prepared in the same manner as described in example IIb. Melting point of the iodomethylate: 235–237° C.

B. Optical isomers: In the same manner as described in A is prepared:

(1) (+)-2-methyl-2,3,9,13b-tetrahydro - 1H - dibenzo-[c,f]-imidazo[3,4-a]-azepine, melting point 138–140° C., $[\alpha_D]^{20}=+58°$, starting from (+)-6-methylaminomethyl - 5,6 - dihydro-morphanthridine, prepared in example V, and (2) the corresponding (—) isomer, melting point 138–140° C., $[\alpha_D]^{20}=-57°$, starting from (—)-6-methylaminomethyl-5,6-dihydro-morphanthridine, prepared in example V. Analysis of the (—) isomer: Calculated: C, 81.56; H, 7.25; N, 11.19. Found: C, 81.53; H, 7.31; N, 11.41.

EXAMPLE VII

Preparation 2,3,9,13b-tetrahydro-1H-dibenzo[c,f]-imidazo[3,4-a]-azepine

A. In the same manner as described in example I 2,3,9,13b-tetrahydro - 1H - dibenzo[c,f]-imidazo[3,4-a]-azepine is obtained (melting point 120–122° C.), starting from 6-aminomethyl-5,6-dihydro-morphanthridine.

B. By the reaction of 2 - methyl-2,3,9,13b-tetrahydro-1H-dibenzo[c,f]-imidazo[3,4-a]-azepine, obtained in example VIA with ethylchloroformate, followed by hydrolysis of the compound thus obtained, a substance is obtained which melts at 118–123° C. The melting point of the mixture of the substances prepared in A and B shows no significant decrease.

EXAMPLE VIII

In an analogous manner as described in example I are prepared:

2-methyl-7-methoxy-2,3,9,13b-tetrahydro-1H-dibenzo-[c,f]-imidazo[3,4-a]-azepine,
2-methyl-7-hydroxy-2,3,9,13b-tetrahydro-1H-dibenzo-[c,f]-imidazo[3,4-a]-azepine, and
12-trifluoromethyl-2,3,9,13b-tetrahydro-1H-dibenzo-[c,f]-imidazo[3,4-a]-azepine.

EXAMPLE IX

Preparation 1,2,3,14b-tetrahydro-dibenzo[c,g]-imidazo[3,4-a]-azocine

In the same manner as described in example IV 6-aminomethyl - 5,6 - dihydro-dibenzo[b,f]-azocine is converted into 1,2,3,14b-tetrahydro-dibenzo[c,g] - imidazo-[3,4-a]-azocine by means of methylenechloride. Melting point 76–78° C.

EXAMPLE X

Preparation 2-methyl-1,2,3,9,10,14b-hexahydro-dibenzo-[c,g]-imidazo[3,4-a]-azocine In the same manner as described in example IV 6-methylaminomethyl - 5,6,11,12 - tetrahydro - dibenzo[b,f]-azocine is converted into 2-methyl-1,2,3,9,10,14b-hexahydro-dibenzo[c,g]-imidazo[3,4-a]-azocine. Melting point 93–96° C.

The same compound is obtained by reducing the final product of example IV. For this purpose 2 gm. of the azocine derivative of example IV is added to 30 ml. of ethylacetate, after which 0.5 gm. of 10% palladium on charcoal is added. The mixture is shaken in $H_2$ atmosphere. After 1.5 hours the catalyst is filtered off and the filtrate evaporated to dryness. Melting point 92–95° C.

EXAMPLE XI

Preparation 1,2,3,12b-tetrahydro-imidazo[3,4-a]-phenanthridinemaleate

Two grams of 6-aminomethyl-5,6-dihydro-phenanthridine is dissolved in 10 ml. of $CH_2Cl_2$, 10 ml. of dimethylsulphoxide and 4 ml. of triethylamine. The mixture is refluxed for 8 hours and then evaporated to dryness. The residue is added to 200 ml. of water. This mixture is extracted three times, each time with 100 ml. of ether. The ether layers are collected, washed and evaporated to dryness with water. Then the residue is dissolved in ethanol, after which 2 gm. of maleic acid are added. The maleate of 1,2,3,12b-tetrahydro-imidazo[3,4-a] - phenanthridine crystallises from this mixture. Melting point of the maleate 146–148° C.

In the same manner the 2-methyl derivative of the above compound is obtained. The free base melts at 85–86° C.

In an analogous manner the 2,6-dimethyl-, the 2-methyl-6-methoxy- and the 2-methyl-11-methoxy-derivatives are prepared.

EXAMPLE XII

Preparation 2-propyl-2,3,9,13b-tetrahydro-1H-dibenzo-[c,f]-imidazo[3,4-a]-azepine 2.5 gm. of 6-propylaminomethyl-5,6-dihydro-morphanthridine are disolved in 15 ml. of methylenchloride, to which 15 ml. of dimethylsulphoxide and 5 ml. of triethylamine have been added.

The mixture is refluxed for 8 hours, after which the excess of methylenechloride and triethylamine are distilled off. To the remaining mixture 18 ml. of water are added. The mixture is left to stand for some time, after which the precipitate formed is filtered off, washed with water and dried on sodium sulphate.

In the same manner 2-benzyl-2,3,9,13b-tetrahydro-1H-dibenzo[c,f]-imidazo[3,4-a]-azepine is prepared starting from 6-benzylaminomethyl-5,6-dihydro - morphanthridine and converted into the maleic acid salt. Melting point 194–196° C.

EXAMPLE XIII

Preparation 2-methyl-2,3,9,13b-tetrahydro-1H-dibenzo-[c,f]-imidazo[3,4-a]-azepine A. A solution of 10 gm. of phosgene in 100 ml. of toluene is slowly added to a solution of 23 gm. of 6-methylaminomethyl-5,6-dihydromorphanthridine and 50 ml. of pyridine in 200 ml. of toluene cooled down to about 0° C. To the reaction mixture 200 ml. of water are added. The mixture is stirred vigorously, after which the water layer is removed. The toluene layer is washed with water, after that with 0.2 M sulphuric acid and finally with water until a neutral reaction of the wash water. After drying of the toluene layer on $Na_2SO_4$ and evaporation 2-methyl-3-keto-2,3,9,13b-tetrahydro - 1H - dibenzo[c,f]-imidazo[3,4-a]-azepine is obtained. Melting point 120–124° C. This crude product is recrystallised from 96% alcohol. Melting point 127–128° C. The same product is obtained, if instead of phosgene diethylcarbonate is used. The same product is obtained in a melt of the above diamine and urea after which the melt is acidified and extracted with ether or toluene.

B. Ten grams of 2-methyl-3-keto-2,3,9,13b-tetrahydro-1H-dibenzo[c,f]-imidazo[3,4-a]-azepine is added, while stirring, to a suspension of 20 gm. of $LiAlH_4$ in 500 ml. of dry ether. The mixture is boiled for 5 hours while stirring. The reaction mixture is cooled down to 0° in a mixture of ice and salt, after which 80 ml. of water are added dropwise, while stirring vigorously. The mixture is stirred for 1 hour and then filtered off. The filtrate is evaporated to dryness in vacuo. After recrystallisation from ethanol 2-methyl-2,3,9,13b-tetrahydro-1H-dibenzo-[c,f]-imidazo[3,4-a]-azepine is obtained. Melting point

What is claimed is:
1. A compound selected from the group consisting of a compound of the formula:

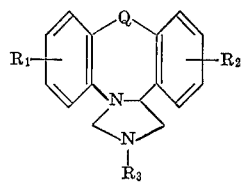

in which
Q is selected from the group consisting of a single bond, 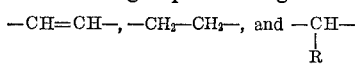

in which R is selected from the group consisting of hydrogen and alkyl of 1–6 carbon atoms,
$R_1$ and $R_2$ are selected from the group consisting of hydrogen, halogen, hydroxy, alkyl of 1–6 carbon atoms, alkoxy of 1–6 carbon atoms, and trifluoromethyl, and
$R_3$ is selected from the group consisting of hydrogen, alkyl of 1–6 carbon atoms, and phenylalkyl of 7–9 carbon atoms, and functional derivatives thereof selected from the group consisting of a pharmaceutically acceptable acid addition salt, a pharmaceutically acceptable quaternary ammonium compound, and a $N^2$-nitrogen oxide.

2. A compound according to claim 1, in which Q represents a —$CH_2$—moiety.

References Cited
UNITED STATES PATENTS 3,509,133  4/1970  Judd et al. _____ 260—309.7
3,435,042  3/1969  Drukker et al. ____ 260—296 P

OTHER REFERENCES

Chemical Abstracts: Eighth Collective Index, Volumes 66–75, 1967–1971, Subjects Dibenzobr-Ethanola, page 9879S (1973). QD1.A51.

Chemical Abstracts: Eighth Collective Index, Volumes 66–75, 1967–1971, Subjects Glucope-Indena, page 15634S (1973). QD1.A51.

The Ring Index, Supplement III to the second edition, page 256, No. 13084, American Chemical Society, 1965. QD291.P3.

NATALIE TROUSOF, Primary Examiner

U.S. Cl. X.R.

260—239 D, 295 A, 295 S, 296 P, 296 T